United States Patent
Barber et al.

(10) Patent No.: US 12,343,736 B2
(45) Date of Patent: Jul. 1, 2025

(54) PROCESS FOR PROTEIN ENRICHMENT OF DRIED DISTILLERS GRAINS USING A TRIBO-ELECTROSTATIC SEPARATOR DEVICE

(71) Applicant: SEPARATION TECHNOLOGIES LLC, Needham, MA (US)

(72) Inventors: Natsuki Barber, Medway, MA (US); Kyle P. Flynn, Moseley, VA (US); Abhishek Gupta, Cambridge, MA (US)

(73) Assignee: ST Equipment & Technology LLC, Needham, MA (US)

( * ) Notice: Subject to any disclaimer, the term of this patent is extended or adjusted under 35 U.S.C. 154(b) by 629 days.

(21) Appl. No.: 17/609,305

(22) PCT Filed: May 8, 2020

(86) PCT No.: PCT/US2020/032098
§ 371 (c)(1),
(2) Date: Nov. 5, 2021

(87) PCT Pub. No.: WO2020/227631
PCT Pub. Date: Nov. 12, 2020

(65) Prior Publication Data
US 2022/0226835 A1    Jul. 21, 2022

Related U.S. Application Data

(60) Provisional application No. 62/845,137, filed on May 8, 2019.

(51) Int. Cl.
*B03C 7/00* (2006.01)
*B02C 23/02* (2006.01)
(Continued)

(52) U.S. Cl.
CPC .............. *B03C 7/006* (2013.01); *B02C 23/02* (2013.01); *B03C 7/003* (2013.01); *B03C 7/08* (2013.01); *C12F 3/10* (2013.01)

(58) Field of Classification Search
CPC ........... B03C 7/08; B03C 7/003; B03C 7/006; B02C 23/02; C12F 3/10; Y02P 60/87
See application file for complete search history.

(56) References Cited

U.S. PATENT DOCUMENTS 4,839,032 A    6/1989    Whitlock
4,874,507 A    10/1989   Whitlock
(Continued)

FOREIGN PATENT DOCUMENTS

CN    1243457 A    2/2000
CN    1883808 A    12/2006
(Continued)

OTHER PUBLICATIONS

Wood, S.G. et al., "Seed Lipid Content and Fatty Acid Composition of Three Quinoa Cultivars", Journal of Food Composition and Analysis, vol. 6, No. 1, pp. 41-44 (1993).
(Continued)

*Primary Examiner* — Michael McCullough
*Assistant Examiner* — Kalyanavenkateshware Kumar
(74) *Attorney, Agent, or Firm* — Lando & Anastasi, LLP (57) ABSTRACT

A tribo-electrostatic separation process for fractionating a feed mixture derived from dried distiller's grains (DDG) or distiller's dried grains and mixed with solubles (DDGS) is disclosed.

25 Claims, 2 Drawing Sheets

(51) Int. Cl.
  *B03C 7/08* (2006.01)
  *C12F 3/10* (2006.01)

(56) References Cited

U.S. PATENT DOCUMENTS

| | | | |
|---|---|---|---|
| 5,704,490 | A | 1/1998 | Reynard |
| 5,904,253 | A | 5/1999 | Cerullo et al. |
| 6,365,856 | B1 | 4/2002 | Whitelaw |
| 2015/0140185 | A1 | 5/2015 | Rajabzadeh et al. |
| 2016/0143346 | A1 | 5/2016 | Pandya et al. |
| 2016/0310957 | A1 | 10/2016 | Barakat et al. |
| 2016/0369305 | A1 | 12/2016 | Piriou et al. |
| 2021/0086196 | A1* | 3/2021 | Gupta ............... A23J 1/12 |

FOREIGN PATENT DOCUMENTS

| | | |
|---|---|---|
| CN | 103079707 A | 5/2013 |
| DE | 19912462 A1 | 2/2000 |
| EP | 1007215 B1 | 8/2002 |
| EP | 1908355 A1 | 4/2008 |
| GB | 2290246 A | 12/1995 |
| RU | 2152263 C1 | 7/2000 |
| RU | 2163168 C2 | 2/2001 |
| RU | 2005129101 A | 1/2006 |
| RU | 2295393 C2 | 3/2007 |
| RU | 2577869 C2 | 3/2016 |
| SU | 187678 A1 | 10/1966 |
| WO | 2019046234 A1 | 3/2019 |

OTHER PUBLICATIONS

Klinzing, G.E., et al. (1997). Pneumatic Conveying of Solids: A Theoretical and Practical Approach (2nd Ed.). Chapman and Hall. Section 3.5, pp. 78-81.
Tabtabaei, S. et al. (2016). "Solvent-free production of protein-enriched fractions from navy bean flour using a triboelectrification-based approach," Journal of Food Engineering, vol. 174, pp. 21-28.
Examination Report in Indian Patent Application No. 202017013468 dated Oct. 27, 2021.
Search Report in Federal Service for Intellectual Property (RU) Patent Application No. 2020112472 dated Dec. 24, 2021.
Office Action in Chinese Patent Application No. 2018800647624 dated Dec. 30, 2022.
Kim E.J. et al: "Nutritional Composition, Nitrogen-Corrected True Metabolizable Energy, and Amino Acid Digestibilities of New Corn Distillers Dried Grains With Solubles Produced by New Fractionation Processes", Poul Try Science, vol. 89, No. 1, Jan. 1, 2010 (Jan. 1, 2010), pp. 44-51, XP055939072, Oxford ISSN: 0032-5791, DOI: 10.3382/PS 2009-00196.
Li Song et al: "Comparison of Protein Concentrate, Protein Isolate and Wet Sieving Processes for Enriching DOGS Protein", Journal of the American Oil Chemists Society, vol. 91, No. 5, May 1, 2014 (May 1, 2014), pp. 867-874, XP055939084, DE ISSN: 0003-021 X, DOI: 10.1007/s11746-014-2411-8 Retrieved from the Internet: URL: https://link.springer.com/content/pdf/10.1007/s117 46-014-2411-8.pdf.
Search Report in Chinese application No. 2018800647624.

* cited by examiner

PROCESS FOR PROTEIN ENRICHMENT OF DRIED DISTILLERS GRAINS USING A TRIBO-ELECTROSTATIC SEPARATOR DEVICE

CROSS-REFERENCE TO RELATED APPLICATIONS

This application is a U.S. national phase application, and claims the benefit of priority under 35 U.S.C. § 371, of International (PCT) Patent Application Serial No. PCT/US2020/032098, filed on May 8, 2020, which claims the benefit of priority under 35 U.S.C. § 119 to U.S. Provisional Patent Application Ser. No. 62/845,137, filed on May 8, 2019, the entire disclosure of which is hereby incorporated herein by reference in its entirety for all purposes

BACKGROUND

Field of Invention

The present invention relates to a process for upgrading the value of dried distillers grains/dried distillers grain with solubles (DDG/DDGS) which is a by-product of ethanol production, by increasing its protein content using a tribo-electrostatic separation process.

BACKGROUND OF THE INVENTION

Many ingredients used in human food and animal feed materials consist of dry mixtures of mostly proteins, starches, sugars, fibers, fats and oils. The naturally occurring crops are harvested, cleaned, dried, tempered, milled, and purified as required for their ultimate usage as ingredients in human food and animal feed products. The purification process typically consists of dry physical separation based on particle size, or wet processes that use additional chemicals, alkaline water, acidic water, or other solvents to purify the component of interest to generate the high value food or feed ingredient, and generate by-products that are used as lower value ingredients.

A major category of feed ingredients are distiller's grains, which are the by-product of the ethanol fermentation and distillation process. Distiller's grains refer to the solid residue produced as a by-product of distillation processes. Distillers grains are produced using corn, rice, or other grains. Distiller's grains can be dried to increase shelf life and allow the by-product to be transported over long distances for use as an animal feed material. Often the dried distiller's grains (DDG) are mixed with condensed distiller's solubles prior to drying. In this case the dried material is referred to as dried distiller's grains with solubles (DDGS). The production of corn-based DDGS has increased tremendously since the 1990s with the growth of fuel ethanol production.

Food and feed ingredient producers and the general public are interested in improved food and feed ingredients containing for example, higher protein content, reduced gluten, higher soluble fiber content, etc. for the reported health benefits in both humans and animals. However, the process technologies required to produce these improved ingredients should not add incremental risks to health, either real or perceived. For this reason, physical purification processes that do not include the use of solvents or the addition of synthetic chemicals are preferred.

Historically, dry purification for food and feed consists of size and density based separation processes such as screening, or air classification. These separation processes are limited to applicability only for materials where there is a significant difference in particle size between the components of interest. For example, size based separation methods are not useful in the separation of wheat gluten from wheat starch where the particle size for both components are similar.

Electrostatic separation processes offer a new approach to purification of dry food ingredients. Electrostatic separation has been applied on the industrial-scale for the past 50 years for the beneficiation of minerals and the recycling of waste materials, but the application to processing of food and feed materials using existing electrostatic separation methods has not yet been demonstrated at commercially significant processing rates.

Electrostatic beneficiation allows for separations based on differences in surface chemistry (work function), electrical conductivity, or dielectric properties. Electrostatic separation systems operate on similar principles. All electrostatic separation systems contain a system to electrically charge the particles, an externally generated electric field for the separation to occur in, and a method of conveying particles into and out the separation device. Electrical charging can occur by one or multiple methods including conductive induction, tribo-charging (contact electrification) and ion or corona charging. Electrostatic separation systems utilize at least one of these charging mechanisms.

Rotating drum electrostatic separation systems have been used in many industries and applications where one component is more electrically conductive than the others. There are multiple variations and geometries used for conductive drum systems, but in general, they operate on similar principles. Feed particles are dispersed onto a rotating drum that is electrically grounded, and then charged by either conductive induction or from an ionizing corona discharge. The electrically conductive particles give up their charge to the surface of the grounded drum. The rotation of the drum causes the conductive particles to be thrown from the surface of the drum, and deposited in the first product hopper. The non-conductive particles retain their electrical charge and are pinned to the surface of the drum. Eventually, the electrical charge on the non-conductive particles will dissipate, or the particles will be brushed from the drum, after the drum has rotated so that the non-conductive particles are deposited in the non-conductive particle hopper. In some applications a middlings hopper is placed in between the conductive and non-conductive product hopper. The effectiveness of this type of separation device is limited to particles which are relatively coarse and/or have a high specific gravity, due to the need for all particles to contact the surface of the drum. In addition, particle flow dynamics is important as angular momentum is ultimately responsible for conveying the particles from the surface of the drum to the respective product hoppers. Fine particles and low density particles are easily influenced by air currents and thus less likely to be thrown from the drum in a predictable area.

A method of separating fibers from oilseeds using a conductive drum separator is described in European patent application EP1908355 A1. Examples are shown for fiber removal from protein for de-oiled coarse rapeseed with particle size greater than 315 microns. The results of the separation depend on optimizing the feed drying process to achieve a difference in moisture level (and therefore conductivity difference) between the fibers and kernels to be separated. This observation is consistent with all conductive drum devices which are limited to separations based primarily on conductivity differences between components. Application of this type of electrostatic separation device is limited for food and feed applications where the difference in electrical conductivity between mixture components is large.

The conductive belt separator is a variant of the rotating separator described above. Feed particles are dispersed evenly across the width of an electrically grounded conveyor belt. Particles are also charged, either by conductive induction or ion bombardment. Again, the conductive particles give their electrical charge up to the grounded conveyor belt, while the non-conductive particles retain their charge. The conductive particles fall off of the edge of the belt by gravity, while the charged non-conductive particles are "lifted" off of the surface of the belt by electrostatic forces. Again, for the separation to be effective, each particle must contact the surface of the belt to allow for the conductive particles to give up their charge to the belt. Therefore, only a single layer of particles can be conveyed by the separator at one time. As the particle size of the feed becomes smaller, the processing rate of the device is reduced.

A method for separating fibers from corn flour using a conductive belt separator is described in US patent application US20160143346 A1. Examples are shown where fiber is removed from coarse corn flour with particle size greater than 704 microns. As in the case of the rotating drum example, the application of this type of device is limited to relatively coarse particle size, and materials where the mixture components exhibit a difference in electrical conductivity that can be exploited.

Parallel plate electrostatic separators are based upon separating particles not on the basis of conductivity, but on differences in surface chemistry that allows for electrical charge transfer by frictional contact, or tribo-charging. Particles are electrically charged by vigorous contact with other particles, or with a third surface such as a metal or plastic with the desired tribo-charging properties. Materials that are electronegative (located on the negative end of the tribo-electric series) remove electrons from the tribo-charging surface and thus acquire a net negative charge. Materials that are on the positive end of the tribo-electric series donate electrons and charge positive. The charged particles are then introduced into an electrical field generated between the two parallel plate electrodes by various transportation means (gravity, pneumatic, vibration). In the presence of the electric field, the charged particles are deflected and move towards the oppositely charged electrodes and are collected at the corresponding product hoppers. A middlings fraction containing a mixture of particles may be collected, depending on the configuration of the separation device.

A method for processing pulses, grains, oilseeds, and dried fruit using a tribo-charger and a separate vertical parallel plate separator is described in US patent application US20150140185 A1. Examples are shown for separation of protein from starch, and protein from starch and fiber for navy bean flour, quinoa flour, and a synthetic mixture of soy flour and corn starch. Tribo-charging was accomplished in a separate step by contacting the feed particles with a PTFE surface using a custom built "tribo-gun" with internal channels coated with PTFE. After tribo-charging, the feed material was separated using a vertical plate device where 40 mg of each stream was collected, dried, and tested for protein content. The experiments appear to have been conducted at laboratory-scale. The feed rate used for the experiments was not disclosed.

Another method of separating fiber from protein for oilseed cakes using a two-step tribo-electrostatic fractionation process is described in US patent application US20160310957 A1. In this process the feed particles are first processed in a tribo-charging step using fluidized air to create electrostatic charges on the moving particles, and then separated using a vertical parallel plate electrostatic sorter where the particles fall and the paths are deviated by the effect of the electric field applied by the vertical parallel plate electrodes. The device is laboratory scale with electrode dimensions 30 cm high×10 cm wide. There is no disclosure of the feed rate used in the device. The vertical electrodes include a means for mechanically scraping the electrodes to remove the particles that adhere to the electrodes during operation. An alternative method of electrode cleaning is described where the polarity of the electric field is periodically reversed to encourage removal the particles that adhere to the electrode during operation. Examples are shown for separation of protein from lignin for sunflower cake and rapeseed cake that was milled to less than 250 micron and both single and twice passed through the separator. Results show significant increase in protein content in the fraction obtained on one of the electrodes and a decrease in protein for the fraction obtained on the opposite electrode. It is not disclosed whether the sample collected was scraped from the electrode or collected in a receiver below the device.

The usefulness of vertical plate electrostatic separators for high rate industrial-scale applications is limited by the fundamental physics associated with deviating the path of particles falling through a separation chamber. In the design of a vertical plate separator, there are at least three forces acting on the particles as they are deviated horizontally from the action of an electric field that is perpendicular to the path of a vertically falling individual particle. The gravitational force moves the particle downward is proportional to the cube of the diameter and directly proportional to the particle density for spherical particles. The electrostatic force on a spherical particle in an electric field is proportional to the square of the particle diameter and directly proportional to the electric field strength. The aerodynamic drag for a spherical particle is proportional to the square of the particle velocity and the particle diameter. By considering these forces for a typical electric field strength in a free-fall vertical plate separator, and the maximum surface charge density that can be achieved on a particle surface, one can show that the ratio of horizontal (deflecting) velocity ($v_h$) to vertical (terminal, falling) velocity ($v_t$) will significantly vary with particle size. In one example, the velocity ratio ($v_h/v_t$) will vary from 0.4 for 300 micron particles to 8.0 for 10 micron particles. One can show that the optimum height (H) to electrode gap (G) ratio for a free-fall vertical plate separator is equal to $2 \times v_h/v_t$. Therefore, the optimum dimensions for a free-fall vertical plate separator depends strongly on the feed particle size. A practical designer would choose dimensions suitable for optimum separation of the most frequently occurring particles (the mode of the feed particle size distribution). Particles that are significantly larger than the mode will not deflect significantly at the discharge of the vertical plate separator and must be collected separately in a middling fraction stream that must be re-ground and recycled to the feed. Particles that are significantly finer than the mode will travel to the vertical plate electrode surface and tend to collect and adhere to the electrodes. For this reason, it is not possible to design a vertical plate separator with dimensions that allow efficient separation of the entire range of particle sizes produced when using standard industrial milling equipment.

Another factor that limits the effectiveness of vertical plate separators is the effect of charges on the particles on the effective electric field in the separation zone. This is known as the space charge effect. When charged particles are introduced between electrode plates, the charges on the particles interact with the charges on the electrode plates and reduce the local electric field. The magnitude of this effect can be estimated using Gauss' law, which states that the electric field flux depends on the magnitude of the total net charge in a control volume. As one moves away from the electrode surface, the electric field is reduced by the presence of charged particles between the point and the surface of the electrode. When the charge in space is equal to the charge on the electrode surface, there is no electric field, and therefore no further particle separation for a vertical plate device. This creates a feed rate limitation inherent to vertical plate electrostatic separators for a given electric field strength and a given electrode width.

The fluidization characteristic of powders is one parameter useful for determining how the particles of the powder behave in tribo-electrostatic separators. Section 3.5 in Pneumatic Conveying of Solids by Klinzig G. E. et al., second edition 1997, describes materials loosely as "aeratable" or "cohesive". The cohesive particles are generally those with finer particle size, lower specific gravity, non-spherical particle shape, and higher surface moisture. Finely milled, charged particles behave as a cohesive powder that adhere to inside surfaces of any processing device creating layers that can build-up over time. Cohesive powders adhere especially well to the surface of the electrodes needed to create the electric field in an electro-static separator. The build-up of cohesive powders on the surface of the electrodes disrupts the applied electric field and results in a deterioration of separation performance. As a result, it is necessary that some type of electrode scraping, or cleaning, mechanism be used to allow for continuous operation of vertical plate separators. This mechanism is complex due to the requirements of electrical isolation of the required high voltage. Furthermore, many bench-top vertical plate separator experiments are conducted in a batch mode where product samples are collected by opening the separator chamber after the experiment and scraping material that has been collected on the electrodes for analysis. This type of results does not allow prediction of separation performance under continuous operation.

Figure 1:
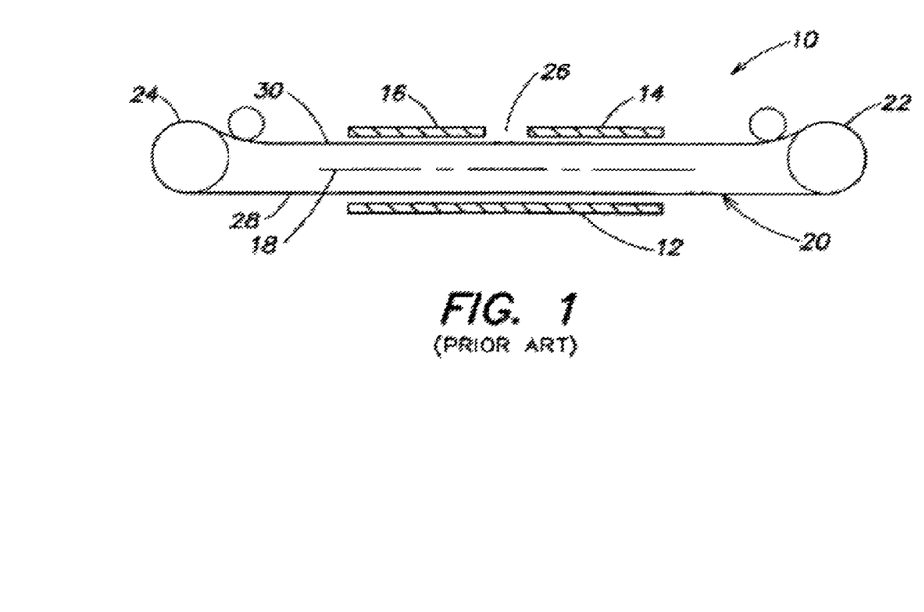
FIG. 1 is a schematic of a prior art tribo-electric belt separator system.
Figure 2:
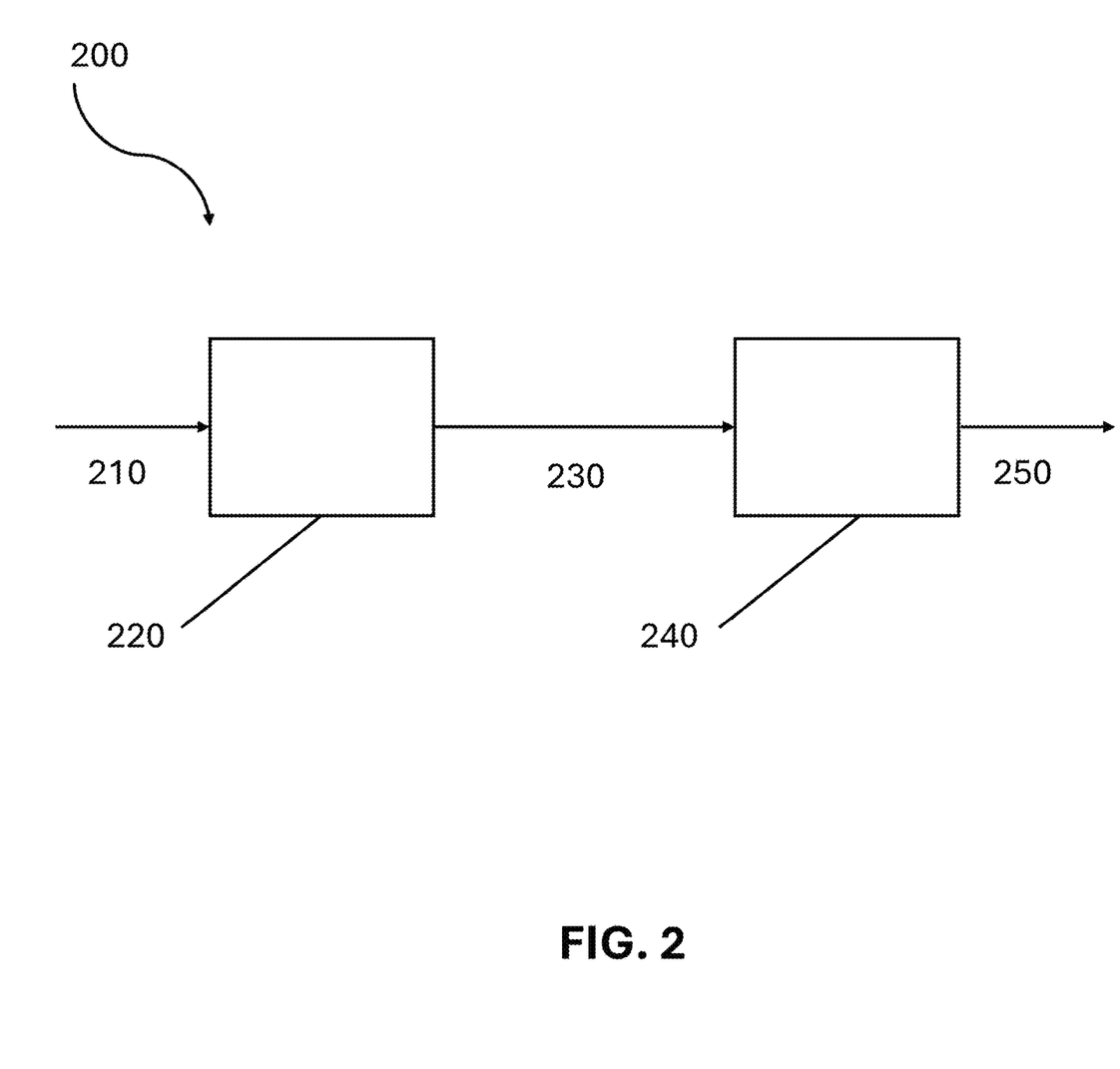
FIG. 2 presents a flow diagram of process 200 for fractionating a feed mixture in accordance with one or more embodiments. Feed 210 is introduced to mill 220. Milled feed 230 is then supplied to tribo-electric separator 240 to produce subfractions 250.

To overcome some of the limitations of vertical plate electrostatic separators, the tribo-electric belt separator (TBS) has been developed by commonly-owned Assignee of this application. FIG. 1 shows a tribo-electric belt separator system 10 such as is disclosed in commonly-owned U.S. Pat. Nos. 4,839,032 and 4,874,507, which are hereby incorporated by reference in their entirety. Tribo-electric belt separators (TBS) are used to separate the constituents of particle mixtures in the minerals and recycling industries. One embodiment of belt separator system 10 includes parallel spaced electrodes 12 and 14/16 arranged in a longitudinal direction to define a longitudinal centerline 18, and a belt 20 traveling in the longitudinal direction between the spaced electrodes, parallel to the longitudinal centerline. The belt 20 forms a continuous loop which is driven by a pair of end rollers 22, 24. A particle mixture is loaded onto the belt 20 at a feed area 26 between electrodes 14 and 16. Belt 20 includes counter-current traveling belt segments 28 and 30 moving in opposite directions for transporting the constituents of the particle mixture along the lengths of the electrodes 12 and 14/16. The only moving part of the TBS is the belt 20. The belt is therefore a critical component of the TBS. The belt 20 moves at a high speed, for example, up to about 20 m/s. The two belt segments 28, 30 move in opposite directions, parallel to centerline 18, and thus if they come into contact, the relative velocity is about 40 m/s.

SUMMARY

In accordance with one or more aspects, a process for fractionating a feed mixture derived from dried distiller's grains (DDG) or distiller's dried grains and mixed with solubles (DDGS) using a single-step tribo-electrostatic separation process is disclosed. The process may comprise: milling the DDG or DDGS feed mixture to a specified particle size, supplying said milled DDG or DDGS feed mixture to a tribo-electrostatic separator, and simultaneously charging and separating said DDG or DDGS feed mixture into at least two subfractions, with one of the subfractions having a protein composition higher than the DDG or DDGS feed mixture and higher than that could be obtained otherwise.

In some aspects, the process may further comprise optionally drying the milled DDG or DDGS feed mixture to a specified moisture level depending on the specified particle size. The milled DDG or DDGS feed mixture may be dried if the specified median particle size is at least about, e.g. 225-250 micron or greater. For example, the pre-drying moisture level for the feed mixture may be greater than about 10.3% and the feed mixture moisture content after drying may be less than about 7.9%.

In some aspects, the DDG or DDGS feed mixture may be characterized by a protein level of between about 30-45%, an oil content of less than about 20%, and/or a moisture content of less than about 30%. The feed protein level may be in a range of from about 30% to about 35%. The protein level of one of the sub-fractions may be enriched to be anywhere in a range of from about 35% to about 55%, e.g. from about 40% to about 55%. In at least some aspects, the protein level of one of the subfractions may be enriched by at least an absolute protein increase of about 5%, e.g. an absolute protein increase of from about 10% to about 25%. In at least some aspects, the feed moisture content may be from about 0% to about 12%. In at least some aspects, the feed oil content may be from about 0.7% to about 12.0%.

In some aspects, the specified particle size may be associated with a fine (e.g. about 50-75 micron or less), medium (e.g. about 100-125 micron) or coarse (e.g. about 225-250 micron or greater) particle size.

In some aspects, the feed mixture may be processed at a rate of about 40 to about 17,000 kg per hour per meter of TBS electrode width. A belt speed of the tribo-electrostatic separation process may be from about 10 to about 70 feet per second. An electric field strength of the tribo-electrostatic separation process may be from about 120 to about 4,000 kV/m.

In some aspects, the DDG or DDGS feed mixture may be milled to a specified median particle size of about 225-250 micron or greater and then dried in order to achieve an absolute protein increase of at least about 10%. The milled DDG or DDGS feed mixture may be dried in order to achieve a moisture content of about 6.4% or less.

In some aspects, the DDG or DDGS feed mixture may be milled to a specified median particle size of less than 125 microns. The feed mixture moisture content may be less than about 5.8%. The milled DDG or DDGS feed mixture need not be dried in order to achieve an absolute protein increase of at least about 10%. In some aspects, the DDG or DDGS feed mixture may be milled to a specified median particle size of about 50-75 micron or less. The milled DDG or DDGS feed mixture need not be dried in order to achieve an absolute protein increase of at least about 10%.

The disclosure contemplates all combinations of any one or more of the foregoing aspects and/or embodiments, as well as combinations with any one or more of the embodiments set forth in the detailed description and any examples.

BRIEF DESCRIPTION OF DRAWINGS

Certain illustrative features and examples are described below with reference to the accompanying figures in which.

The advantages of the aspect and embodiments of this disclosure may be better understood by referring to the following description when taken in conjunction with the drawings. The drawings are not intended to be drawn to scale. In the drawings, each identical or nearly identical component that is illustrated in various figures is represented by a like numeral. For purposes of clarity, not every component may be labeled in every drawing. It will be recognized by the person of ordinary skill in the art, given the benefit of this disclosure, that the dimensions, sizes, components, and views shown in the figures are for illustrative purposes. Other dimensions, representations, features, and components may also be included in the embodiments disclosed herein without departing from the scope of the description.

DETAILED DESCRIPTION

The disclosure is not limited in its application to the details of construction and the arrangement of components set forth in the following description or illustrated in the drawings. Aspects of the disclosure are capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items. At least one aspect of the present disclosure is directed to a tribo-electric enrichment process and system for the enrichment of protein content from low value by-products such as, for example, those resulting from distillation industries i.e. dried distiller's grains with or without solubles (DDGS or DDG) and to the resulting products from the process, particularly the product that is enriched in protein. The higher protein content products can have increased value as an ingredient in animal feed formulations. In particular, at least one embodiment of the process includes supplying a DDGS/DDG feed mixture to a tribo-electric separator and charging and separating the feed mixture into at least two sub-fractions, with one of the subfractions enriched in protein and having a composition different than the feed mixture. In at least one embodiment, the protein concentration of one of the products of the separator apparatus and process is higher than would otherwise be achievable with the prior art processes or that is naturally occurring.

Corn DDGS/DDG feed produced by conventional methods may contain about 25% to about 35% protein. U.S. Pat. No. 8,227,015B2 discloses a process to extract minor amounts of residual oils from DDGS to raise the protein to a maximum of about 35%. U.S. Pat. Nos. 8,778,433 and 10,233,404 disclose a complicated wet process modification to the conventional alcohol production process where the whole stillage slurry after alcohol distillation is filtered, centrifuged, dewatered, and dried to produce a high protein meal product with greater than 40% protein. This wet process requires significant modification to the "back end" of the ethanol distillation process and complicates operation of the main process. It is an object of this disclosure to provide a process where the protein concentration of DDGS/DDG feed mixtures are increased using an entirely dry process that operates separately from the ethanol production process and does not require modification to the existing ethanol production process. According to at least one embodiment, it is an object to process such feed mixtures to provide subfractions having a protein composition of at least 40%. According to at least one embodiment, it is an object to process such feed mixtures to provide subfractions having a protein composition of at least 50% protein.

The present disclosure relates to a novel process for fractionating DDG/DDGS into their constitutive components using the tribo-electric belt separator (TBS) and process. The apparatus of FIG. 1 and the process are effective at processing dry, granular food and feed materials in a single-step separation process, as a continuously operating process, at commercially significant processing rates. By single step process, what is meant is that the constituents to be a separated are simultaneously tribo-electrically charged, conveyed and separated. The process has particular application in the enrichment of protein content of food and feed materials by separating the protein particles from fibers. Aspects and embodiments of the process have a particular benefit for the separation of dried distiller's grains resulting from the distillation industries mixed with solubles (DDGS) to enrich the protein content of at least one of the resulting products from the process.

The TBS operates as a single-step device where the food and feed particles are simultaneously tribo-charged by the frequent particle to particle collisions that occurs in the single device through the action of the special high-speed continuous-loop belt, conveyed and separated. Electrostatic separation processes based on tribo-charging are superior, and have wider application, than those based on charging by conductive induction or ion bombardment because separation can be achieved for a larger variety of particles with subtle differences in surface chemistry (or surface work function). Because the particle number density is so high within the electrode gap and the flow is vigorously agitated by the high speed belt, there are many collisions between particles in the device, and optimal tribo-charging occurs continuously throughout the separation zone. The counter-current flow induced by the motion of the continuous-loop belt creates counter-current multi-stage separation within the TBS device.

In contrast to the TBS apparatus and process according to this disclosure, vertical plate electrostatic separators all require a separate upstream processing step to tribo-charge the feed particles prior to separation by the vertical plate separator. For vertical plate separators, the tribo-charging step may require that each particle contacts a special solid surface with particular surface properties to enable differential charge to develop on the surface of particles. However, the need for each feed particle to contact a special solid surface creates a significant limitation on the maximum processing rate that can be achieved with a vertical plate separator for a compact device.

An issue with separating food and feed materials is that they tend to be cohesive powders that adhere especially well to the surface of the electrodes needed to create the electric field in an electro-static separator. An advantage of the motion of the high speed continuous loop belt in the TBS device and process of this disclosure is that it continuously scrapes the electrodes, which aids in removing the cohesive feed and feed materials from the electrodes and depositing them in the appropriate product hopper. The high speed continuous loop belt is the only moving part in the TBS device and process, and by its design and high speed motion it simultaneously conveys and tribo-charges the feed material, and the belt also provides a system to continuously clean electrodes of cohesive feed and feed materials that adhere to the electrodes. This feature enables the TBS apparatus and process of this disclosure to operate continuously without the need for complex electrode scraping mechanisms or electrode polarity switching systems that are required for vertical plate processes.

One advantage of the TBS apparatus and process of this disclosure, as illustrated by the test examples disclosed herein, is that the TBS apparatus and process can be used to separate feed materials, often in their naturally occurring state with their naturally occurring moisture and oil content (that little to no pre-processing is necessary) to achieve separation of the feed content into two enriched streams of at least one of protein, fiber or starch. It is also appreciated that the moisture content of feed material for the TBS apparatus and process can be adjusted to a range that optimizes the particle tribo-charging and therefore optimizes the resultant separation results. The optimal moisture level can depend on the nature of the feed material and will typically vary between 0% and 30%, and preferably between 0.2 and 12%. Adjustment of feed moisture is advantageous for some food and feed materials, but it is not a necessary requirement to adjust the moisture level of food and feed materials to achieve satisfactory separation results for some materials using the TBS device and process of this disclosure. This observation demonstrates a unique feature and advantage of the TBS apparatus and process of the disclosure, which is that the single step tribo-charging and separating that occurs in the TBS process is adequate to charge the individual components to be separated without the need for a separate tribo-charging step.

According to aspects and embodiments disclosed herein, the TBS device and process can be operated with belt speed between 10 and 70 feet per second, preferably between 15 and 65 feet per second; the voltage applied to the electrodes of the TBS apparatus and process electrodes can vary between 3 kV and 20 kV, preferably between 10 and 16 kV; and the gap between the electrodes may be continuously adjustable and can be varied between 0.5 to 2.5 cm, preferably between 0.9 to 1.7 cm.

Examples of separation results obtained from at least one feed material are detailed in the following example.

Example 1: Enrichment of Protein from DDGS

A sample of corn-based distillers dried grains with solubles (DDGS) was prepared for testing using the TBS apparatus and process to demonstrate the capability of the TBS apparatus and process to simultaneously charge and separate distinct protein and starch particles using the TBS apparatus and process in a single step. Feed sample was prepared at three different particle sizes using an impact-type mill—coarse grind with a median (D50) particle size: 225-250 micron, medium grind (D50) with a median particle size: 100-125 micron, and fine grind with a median (D50) particle size: 50-75 micron. The results are described below:

Medium Grind

The sample was milled using an impact-type mill to a median particle size of approximately 100-125 micron, contained approx. 8% moisture after milling. The feed sample was fed as-received, with no adjustment to the moisture content, into the TBS separator at a rate of 17 tonne per hour per meter of TBS electrode width. The TBS belt speed was set at 15 feet per second, and 12 kV was applied across the TBS electrode gap to produce an electric field strength of 1390 kV/m. Two resulting products were collected from the two ends of the separator. There was no middling fraction that needed to be re-processed. Table 1 shows the mass yields of the two products, the composition of the feed and the products, achieved in a first pass. For purposes of this example, first pass refers to the feed material having been processed through the separator once.

TABLE 1

Results from testing corn-based DDGS (medium grind, first pass)

|  | Feed | Product 1 (Enriched Fiber) | Product 2 (Enriched Protein) |
| --- | --- | --- | --- |
| Mass | 100% | 71% | 29% |
| Protein (dry basis) | 34.8% | 30.0% | 46.8% |
| Moisture | 7.9% | — | — |
| Crude Fiber | 6.9% | 9.0% | 3.8% |
| Fiber (ADF) | 11.3% | 11.8% | 11.0% |
| Fiber (NDF) | 26.6% | 34.8% | 14.0% |
| Oil | 7.2% | 7.1% | 7.6% |
| Protein Recovery |  | 51% | 49% |

The high-protein product from the first pass was then processed through the separator again (second pass) and further protein increase was achieved. The results are shown in Table 2.

TABLE 2

Results from testing corn-based DDGS (medium grind, second pass)

|  | Feed | Product 1 (Enriched Fiber) | Product 2 (Enriched Protein) |
| --- | --- | --- | --- |
| Mass | 100% | 55% | 45% |
| Protein (dry basis) | 46.8% | 42.7% | 51.8% |
| Moisture | 7.9% | — | — |
| Fiber (ADF) |  | 11.1% | 8.9% |
| Fiber (NDF) |  | 19.3% | 13.0% |
| Oil |  | 7.7% | 7.8% |
| Protein Recovery |  | 50.3% | 49.7% |

The effect of moisture on medium grind feed by drying was tested, and no significant effect on protein separation was found.

Fine Grind

The sample was milled using an impact-type mill to a median particle size of approximately 50-75 micron, contained approx. 6% moisture after milling. The feed sample was fed as-received, with no adjustment to the moisture content, into the TBS separator at a rate of 17 tonne per hour per meter of TBS electrode width. The TBS belt speed was set at 15 feet per second, and 12 kV was applied across the TBS electrode gap to produce an electric field strength of 1390 kV/m. Table 3 shows the mass yields of the two products, the protein content of the feed and the products.

TABLE 3

Results from testing corn-based DDGS (fine grind)

|  | Feed | Product 1 (Enriched Fiber) | Product 2 (Enriched Protein) |
| --- | --- | --- | --- |
| Mass | 100% | 70% | 30% |
| Protein (dry basis) | 33.9% | 28.8% | 45.9% |
| Moisture | 5.8% | — | — |

Coarse Grind

The sample was milled using an impact-type mill to a median particle size of approximately 225-250 micron, contained approx. 10% moisture after milling. The feed sample was fed as-received, with no adjustment to the moisture content, into the TBS separator at a rate of 17 tonne per hour per meter of TBS electrode width. The TBS belt speed was set at 65 feet per second, and 12 kV was applied across the TBS electrode gap to produce an electric field strength of 1390 kV/m. Table 4 shows the mass yields of the two products, the protein content of the feed and the products.

TABLE 4

Results from testing corn-based DDGS (coarse grind)

|  | Feed | Product 1 (Enriched Fiber) | Product 2 (Enriched Protein) |
| --- | --- | --- | --- |
| Mass | 100% | 84% | 16% |
| Protein (dry basis) | 34.1% | 33.5% | 39.0% |
| Moisture | 10.3% | — | — |

Effect of moisture was investigated on coarse grind feed by drying. Table 5 shows the mass yields of the two products, and protein content of the feed and the products upon reduction of moisture content. In comparison to Table 4, results showed that the protein separation improved significantly at similar mass yields compared to the un-dried feed for coarse grind feed.

TABLE 5

Results from testing corn-based DDGS (coarse grind, dried)

|  | Feed | Product 1 (Enriched Fiber) | Product 2 (Enriched Protein) |
| --- | --- | --- | --- |
| Mass | 100% | 85.1% | 14.9% |
| Protein (dry basis) | 34.1% | 32.5% | 44.1% |
| Moisture | 6.4% | — | — |

It was demonstrated that in order to achieve substantial protein increase (≥10% absolute) the feed material must be milled to a particle size with median (D50): 100-125 micron, or milled to finer particle size with median (D50): 50-75 micron, or milled to coarse particle size with median (D50): 225-250 micron and then dried, for example, to 6.4%. It is reasonable to conclude that drying is also useful for particle sizes of greater than 225-250 micron. For example, coarse milled feed material may need to be dried in order to achieve at least about a 10% absolute increase in protein content. Drying does not appear to be required for particle sizes of 100-125 micron or finer. In at least some embodiments, DDG or DDGS with a particle size equal to or less than about median (D50): 100-125 micron need not be dried in order to still achieve at least about a 10% absolute increase in protein content.

This example demonstrates the capability of TBS process to effectively tribo-charge and separate distinct protein and fiber particles in a single step from a DDGS feed sample in fine dry powder form, generating product streams enriched in each component.

What is claimed is:

1. A process for fractionating a feed mixture derived from dried distiller's grains (DDG) or distiller's dried grains and mixed with solubles (DDGS) using a single-step tribo-electrostatic separation process, comprising:
    a. drying the DDG or DDGS feed mixture
    b. milling the DDG or DDGS feed mixture to a median particle size of 225-250 microns;
    c. supplying said milled DDG or DDGS feed mixture to a tribo-electrostatic separator; and
    d. simultaneously tribo-electrically charging and separating said DDG or DDGS feed mixture into at least two subfractions, with one of the subfractions having a protein composition higher than the DDG or DDGS feed mixture.

2. The process of claim 1, wherein the pre-drying moisture level for the feed mixture was greater than 10.3% and the feed mixture moisture content after drying was less than 7.9%.

3. The process of claim 1, wherein the DDG or DDGS feed mixture is characterized by a protein level of between 30-45%, an oil content of less than 20%, and/or a moisture content of less than 30%.

4. The process of claim 3, wherein the feed protein level is in a range of from 30% to 35%.

5. The process of claim 4, wherein the protein level of one of the sub-fractions is enriched to be anywhere in a range of from 35% to 55%.

6. The process of claim 3, wherein the feed moisture content is from 0% to 12%.

7. The process of claim 3, wherein the feed oil content is from 0.7% to 12.0%.

8. The process of claim 1, wherein the protein level of one of the subfractions is enriched by an absolute protein increase of 5% to 25%.

9. The process of claim 1, wherein the feed mixture is processed at a rate of 40 to 17,000 kg per hour per meter of TBS electrode width.

10. The process of claim 1, wherein a belt speed of the tribo-electrostatic separation process is from 10 to 70 feet per second.

11. The process of claim 1, wherein an electric field strength of the tribo-electrostatic separation process is from 120 to 4,000 kV/m.

12. The process of claim 1, wherein an absolute protein increase of at least 10% is achieved.

13. The process of claim 12, wherein the DDG or DDGS feed mixture is dried in order to achieve a moisture content of 6.4% or less.

14. A process for fractionating a feed mixture derived from dried distiller's grains (DDG) or distiller's dried grains and mixed with solubles (DDGS) using a single-step tribo-electrostatic separation process, comprising:
    a. milling the DDG or DDGS feed mixture to a median particle size of less than 150 microns;
    b. supplying said milled DDG or DDGS feed mixture to a tribo-electrostatic separator; and
    c. simultaneously tribo-electrically charging and separating said DDG or DDGS feed mixture into at least two subfractions, with one of the subfractions having a protein composition higher than the DDG or DDGS feed mixture; and wherein the milled DDG or DDGS feed mixture need not be dried.

15. The process of claim 14, wherein the milled feed mixture moisture content is less than 7.9%.

16. The process of claim 14, wherein an absolute protein increase of at least 10% is achieved.

17. The process of claim 14, wherein the DDG or DDGS feed mixture is milled to a particle size of 50-75 microns.

18. The process of claim 14, wherein the DDG or DDGS feed mixture is characterized by a protein level of between 30-45%, an oil content of less than 20%, and/or a moisture content of less than 30%.

19. The process of claim 14, wherein the feed protein level is in a range of from 30% to 35%.

20. The process of claim 14, wherein the protein level of one of the subfractions is enriched by an absolute protein increase of 5% to 25%.

21. The process of claim 14, wherein the feed moisture content is from 0% to 12%.

22. The process of claim 14, wherein the feed oil content is from 0.7% to 12.0%.

23. The process of claim 14, wherein the feed mixture is processed at a rate of 40 to 17,000 kg per hour per meter of TBS electrode width.

24. The process of claim 14, wherein a belt speed of the tribo-electrostatic separation process is from 10 to 70 feet per second.

25. The process of claim 14, wherein an electric field strength of the tribo-electrostatic separation process is from 120 to 4,000 kV/m.

* * * * *